United States Patent [19]

Sievenpiper

[11] Patent Number: 5,285,871
[45] Date of Patent: Feb. 15, 1994

[54] SYSTEM FOR DISTRIBUTING VISCOUS LUBRICANT

[75] Inventor: Donald A. Sievenpiper, Saint Charles, Ill.

[73] Assignee: Mechanical Tool & Engineering Co., Rockford, Ill.

[21] Appl. No.: 929,989

[22] Filed: Aug. 17, 1992

[51] Int. Cl.⁵ .............................................. F16N 27/00
[52] U.S. Cl. ........................................ 184/7.4; 184/29; 184/39; 184/40
[58] Field of Search .................... 184/7.4, 29, 39, 39.1, 184/40

[56] References Cited

U.S. PATENT DOCUMENTS

| | | | |
|---|---|---|---|
| 715,717 | 12/1902 | Whitaker | 184/40 |
| 2,164,273 | 6/1939 | Hodson | 184/29 |
| 2,719,603 | 10/1955 | Le Clair. | |
| 3,481,431 | 12/1969 | Dorsey | 184/39.1 |
| 3,724,600 | 4/1973 | Moody. | |
| 3,995,717 | 12/1976 | Kroffke. | |
| 4,520,902 | 6/1985 | Snow. | |
| 4,648,486 | 3/1987 | Kayser et al. | 184/29 |
| 5,060,761 | 10/1991 | Arndt et al. | 184/29 |

FOREIGN PATENT DOCUMENTS

| | | | |
|---|---|---|---|
| 0140265 | 5/1985 | European Pat. Off. | 184/7.4 |
| 1401226 | 6/1988 | U.S.S.R. | 184/7.4 |

Primary Examiner—Thomas E. Denion
Attorney, Agent, or Firm—Vernon J. Pillote

[57] ABSTRACT

A system for distributing measured quantities of viscous lubricant to a plurality of lubricating points. The system includes a plurality of injector cylinders and a container for viscous lubricant. A selectively operable hydraulic fluid pressure supply pump supplies hydraulic fluid to an hydraulic cylinder for pressurizing lubricant in the container at a low pressure to feed lubricant to the injector cylinders, and the fluid pressure supply pump supplies hydraulic fluid at a high pressure to the injector cylinders to feed lubricant to the lubricating points.

14 Claims, 2 Drawing Sheets

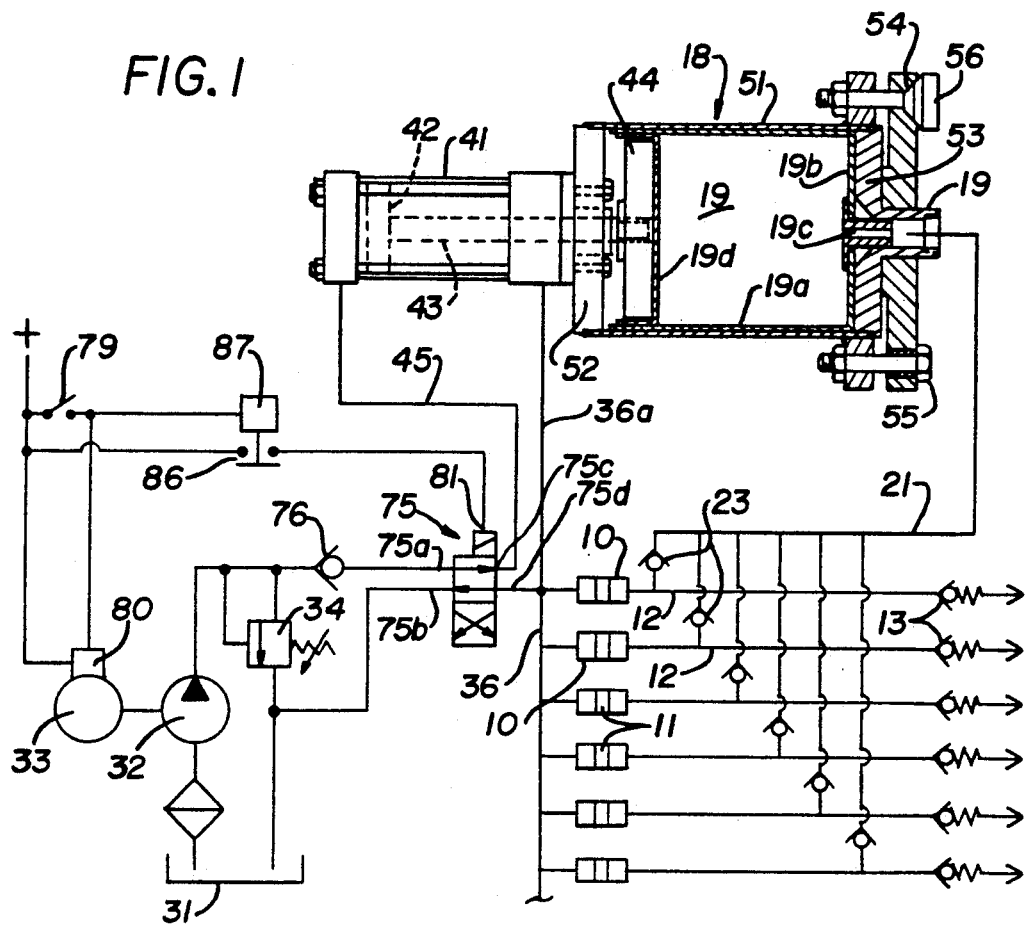
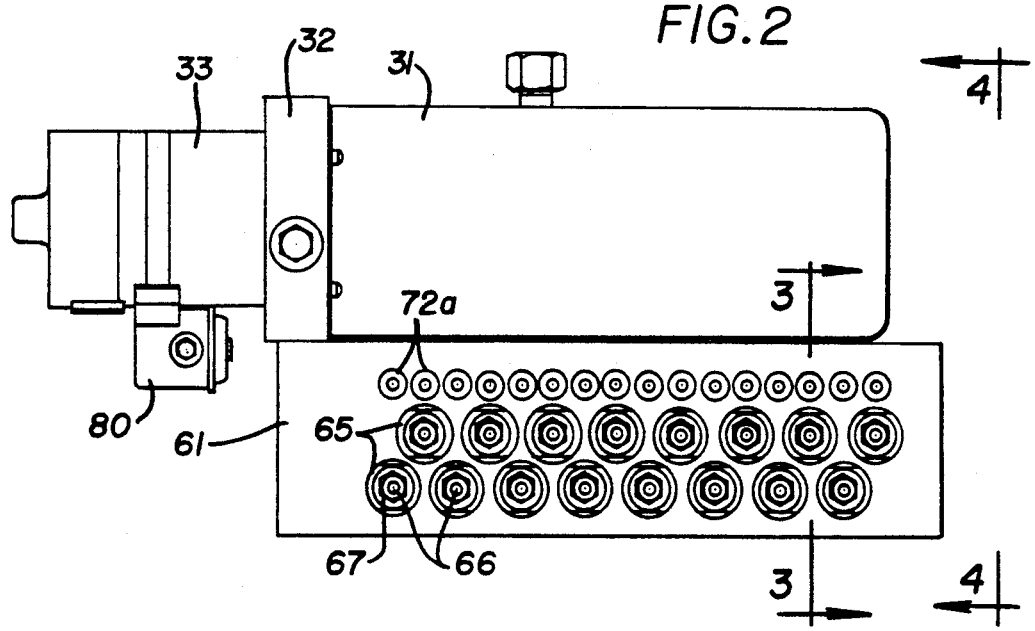

SYSTEM FOR DISTRIBUTING VISCOUS LUBRICANT

BACKGROUND OF THE INVENTION

The present invention relates to a centralized lubrication system for feeding lubricant in predetermined quantities to a plurality of points of use such as bearings in vehicles and machinery.

Various centralized lubrication systems have heretofore been proposed for distributing and injecting lubricant to a plurality of bearings or the like. Some centralized lubrication systems such as disclosed in U.S. Pat. Nos. 3,995,717 and 4,520,902, utilize a single positive displacement lubricant pressure pump, and a plurality of distributing valves that are connected to the pressure pump and arranged to distribute the pressurized lubricant to a plurality of points of use. However, problems are encountered in using a lubricant pump for pumping viscous lubricants or greases. Some other central lubrication systems such as disclosed in U.S. Pat. No. 3,724,600 pressurize the grease in supply tanks and feed the pressurized grease through distribution and metering valves to the various points of use under the pressure of the grease from the supply tanks. This not only requires grease supply tanks capable of withstanding relatively high pressures, but also limits the pressure at which the grease is fed to the points of use. U.S. Pat. No. 2,719,603 discloses a lubricant dispensing system wherein grease is fed to a distributing valve and a pneumatically actuated injector and in which the injector actuating piston has an area that is large as compared to the area of the injector piston, to increase the pressure on the grease supplied to the points of use. However, this arrangement requires a relatively complex injector and valving arrangement and seals which are capable of preventing leakage of air into the grease.

SUMMARY OF THE INVENTION

It is an object of the present invention to provide a system for distributing viscous lubricants and which is arranged to pressurize lubricant in the lubricant supply container at a relatively low pressure for feeding the viscous lubricant to the lubricant injectors, and which is operative to force the lubricant from the injectors under very high pressure to effect more reliable feeding of lubricant to the multiple points of use, and which effectively prevents bleeding of air into the viscous lubricant during feeding and distribution of the lubricant.

Accordingly, the present invention provides a system for distributing viscous lubricant including a lubricant container, a plurality of injector cylinders each having a floating piston therein, lubricant inlet passage means communicating an outlet of the lubricant container with each of the injector cylinder at one side of the floating piston and a plurality of lubrication distribution passages each communicating with a respective one of the injector cylinders at said one side of the injector piston. The lubricant inlet passages include inlet check valve means individual to each injector cylinder operable to open for flow to the respective injector cylinder, and the distribution passage means includes outlet check valve means operable to open for flow from the respective injector cylinder. Hydraulic fluid pressure supply means including a fluid reservoir, pump means and selectively operable motor means for driving the pump means, is arranged to supply hydraulic fluid at a preselected high pressure range and means are provided for supplying fluid at said high pressure to the injector cylinders at a second side of the floating piston therein to feed lubricant from the injector cylinders to the lubrication distribution passages, and means actuated by the hydraulic fluid pressure supply means is provided for pressurizing the lubricant in the lubricant container at a second pressure that is low as compared to said preselected high pressure range to feed lubricant from the lubricant container to the injector cylinders. Means are provided for inhibiting opening of the outlet check valve means until the pressure at the outlet side of the injector cylinders exceeds the second pressure.

The means for pressuring the lubricant in the lubricant container includes a plunger in the lubricant container and a pressurizing cylinder connected to the lubricant container having a pressurized piston connected to the plunger. The pressurizing piston has an area that is small as compared to the area of the plunger such that the plunger pressurizes the lubricant in the lubricant container at a low pressure when the fluid in the high pressure range is applied to the pressurizing piston.

BRIEF DESCRIPTION OF THE DRAWINGS

FIG. 1 is schematic diagram of a system for distributing viscous lubricant to a plurality of points of use in accordance with the present invention;

FIG. 2 is a side elevational view of a manifold body containing the multiple grease injectors and having an hydraulic fluid pressure supply unit mounted thereon;

DETAILED DESCRIPTION

Figure 3:
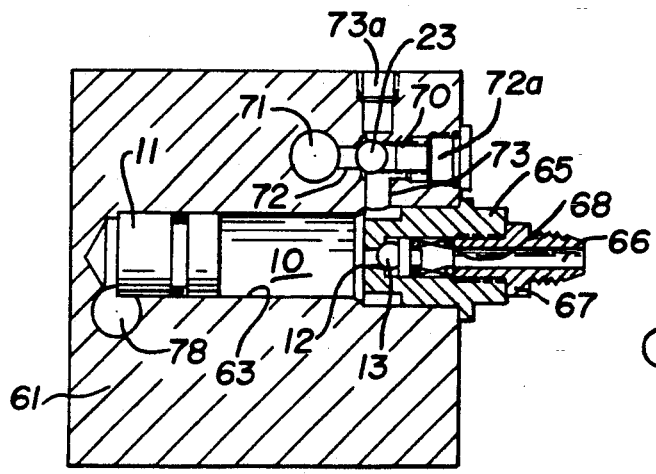
FIG. 3 is a transverse sectional view taken on the plane 3—3 of FIG. 2 and illustrating parts on a larger scale to illustrate details of construction.

The system includes a plurality of injector cylinders 10 each having a floating piston 11 therein and lubricant outlet passages 12 each communicating with a respective one of the injector cylinders at one side of the piston, and outlet check valve means 13 individual to each outlet passage, operable to open flow from the respective injector cylinder. A lubricant container 18 is provided for storing a quantity of viscous lubricant or grease and the lubricant container has an outlet 19 connected through lubricant inlet passage means 21 for supplying lubricant to each of the injector cylinders 10 at the outlet side of the injector pistons. The lubricant inlet passage means includes inlet check valves 23 individual to each injector cylinder and operable to open for flow to the respective injector cylinder. A hydraulic fluid pressure supply means includes a fluid reservoir 31, a rotary positive displacement hydraulic pump 32 and an electrical drive motor 33 for driving the pump. A relief valve 34 is connected to the pump outlet for limiting the pump discharge pressure. The motor, pump and relief valve are selected so that the pump supplies hydraulic fluid at a relatively high pressure when the motor is energized, for example of the order of 1500 psi and means including hydraulic fluid supply passages 36 are provided for supplying fluid pressure from the pump to the injector cylinders at a second side of the piston therein to feed lubricant from the injector cylinders. An hydraulic cylinder 41 is attached to the lubricant container and has a piston 42 therein connected through a piston rod 43 to a plunger 44 in the lubricant container. A means including hydraulic fluid supply passages 45 are provided for supplying high pressure fluid from the pump 32 to the pressuring cylinder to pressurize the lubricant in the container 18 for feeding lubricant from the container through the lubricant inlet passage means 21 to the injector cylinders. The hydraulic cylinder 41 is selected so that the piston 42 has an effective cross-sectional area that is small as compared to the cross-sectional area of the plunger 44, so that the lubricant in the lubricant container is pressurized at a low pressure that is low as compared to the pump outlet pressure and sufficient to reliably feed lubricant to the injector cylinders when the pressure at the inlet side of the injector pistons is at about atmospheric pressure. The pressurizing piston 42 may, for example, have an effective area that is about one-fifth the area of the plunger so that the lubricant in the container is pressurized at only about 300 psi when the pressure at the outlet of the pump is of the order of 1500 psi.

The lubricant container 18 has a generally cylindrical side wall 51 and a head 52 fixed to one end. A cover 53 is removably mounted on the other end of the cylinder 51 and retained in a closed position by a clamp bar 54 and bolts 55, 56. Grease may be stored directly in the container 18 provided the plunger is arranged to provide a sliding seal with the cylinder. However, the grease is preferably stored in a replaceable cartridge 19. The cartridge may, for example, be of a type commonly used in grease guns and having a cylindrical side wall 19a with an end wall 19b at one end terminating in an outlet spout 19c, and with a movable cap 19d in the side wall which can be moved by the plunger toward the outlet end of the cartridge. It is also contemplated that the cartridge could be of a collapsible type having a corrugated or bellows type side wall.

Figure 4:
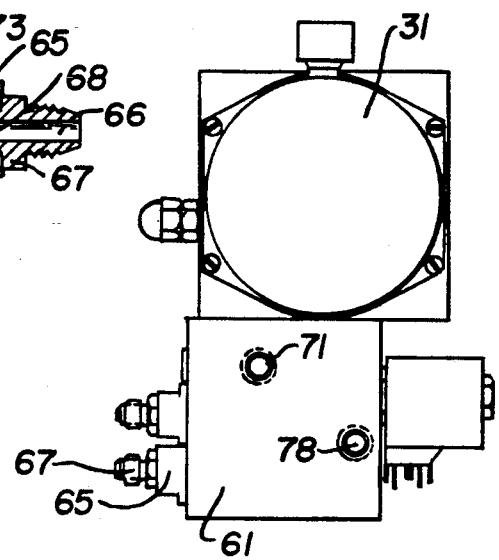
FIG. 4 is an end elevational view of the apparatus taken on the plane 4—4 of FIG. 2.

The injector cylinders can conveniently be formed in a manifold body 61. As best shown in FIGS. 2-4, the manifold body is formed with one or more rows of bores 63 extending into one side of the body with an injector piston 11 slidable in each bore as best shown in FIG. 3. A cartridge 65 is threaded into the open end of each of the bores 63 and has outlet passage means 66 extending therethrough and an outlet fitting 67 for connecting the outlet passage through a distribution tube or hose (not shown) to the a lubrication point. The outlet check valves 13 are conveniently mounted in each cartridge 65 and the outlet check valves are each yieldably biased by a spring 68 to a closed position. For reasons pointed out more fully hereinafter, the springs 68 are preferably selected so as to inhibit opening of the outlet check valve 13 until the pressure in the outlet end of the injector cylinder is higher than the pressure applied to the lubricant in the lubricant container. The lubricant inlet passage means 21 includes a lengthwise extending bore 71 in the manifold body and passages 72 and 73 that communicate the bore 71 with a respective one of the injector cylinders at the outlet side of the piston 11. The inlet check valves 23 are conveniently in the form of ball type checks that are yieldably biased to a closed position by springs 70 which apply a light closing pressure sufficient to assure reliable closing. The outer ends of the bores 72 and 73 are closed by plugs 72a and 73a. The hydraulic fluid supply passages 36 are conveniently in the form of a passage 78 that extends lengthwise in the manifold body and arranged to intersect and communicate with each of the injector cylinders adjacent the closed ends of the bores 63.

In the embodiment of FIG. 1, a hydraulic flow reversing valve 75 is provided for controlling application of fluid pressure from the fluid pressure supply means to the pressurizing cylinder 41 and to the injector cylinders 10. The valve 75 has a pressure supply port 75a connected through a check valve 76 to the discharge side of the pump 32, and a return port 75b connected to the reservoir 31. The valve also has one control port 75c connected to the pressurizing cylinder 41 at the end remote from the lubricant container and a second control port 75d that is connected to the pressure supply passages 36 and also to a passage 36a communicating with the pressurizing cylinder at the rod end of the piston. Valve 75 is normally positioned as by a return spring in the position shown in FIG. 1 to supply fluid from the discharge side of the pump to pressurizing cylinder to extend the plunger 44 and pressurize the lubricant in the lubricant container. Thus, when the pump drive motor is energized at the beginning of a lubricant dispense cycle by closing of a manually operated switch 79 connected to motor start relay 80, the pump 33 operates the pressurizing piston to pressurize the lubricant in the container and feed lubricant through the lubricant inlet passage means 21 and check valves 23 to the injector cylinders at the lubricant side of the pistons 11. Valve 75 is selectively operable as by a solenoid 81 to a second position shutting off fluid pressure to the pressurizing cylinder 41 and applying fluid pressure to the hydraulic fluid supply passages 36 and 36a. The pressure applied through passages 36 to the pistons in the injector cylinders is high as compared to the pressure on the lubricant in the lubricant container so that inlet check valves 23 are pressed to their closed position and outlet check valves 13 open to allow discharge of lubricant from the injectors at the relatively high pump discharge pressure. Pressure applied through the passage 36a when the valve is in ite second position, retracts the pressurizing piston 42 and depressurizes the lubricant in the lubricant container. Valve 75 is preferably operated to its second position a predetermined time delay after starting of the pump, sufficient to allow feeding of lubricant from the lubricant container to the injector cylinders, and a means such as a switch 86 operated by a timer 87 is provided in the control circuit for solenoid 81 to move the valve to the second position a predetermined time delay after closing of switch 79 and starting of the pump, for discharging of lubricant from the injector cylinders. After a time sufficient to allow ejection of the lubricant from the cylinders 10, the motor is de-energized by opening switch 79 to stop the pump. In this embodiment, the lubricant in the lubricant container is de-pressurized at the end of each lubricant dispensing cycle.

Figure 5:
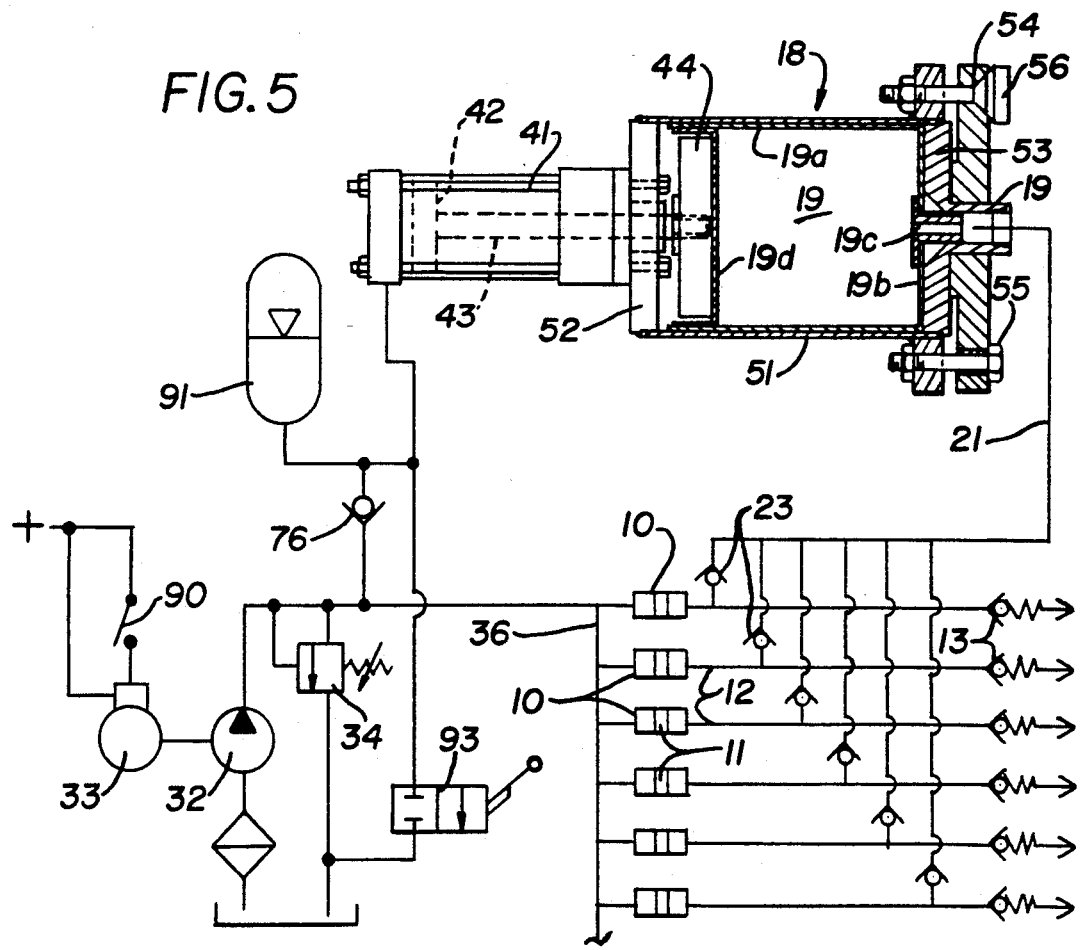
FIG. 5 is a schematic diagram illustrating a modified form of central lubrication system.

A modified system is illustrated for FIG. 5 in which the feeding of lubricant from the lubricant container to the injector cylinders and the discharge of lubricant from the injector cylinders is arranged to be effected in response to starting and stopping of the hydraulic pump. In this embodiment, the outlet of the hydraulic pump 32 is connected directly to the hydraulic fluid supply passages 36 and through a check valve 76 to the pressurizing cylinder 41 and to an hydraulic accumulator 91. When the motor is energized under control of a switch 90 and starts the pump 32, fluid under pump discharge pressure is supplied through hydraulic fluid supply passages 36 to the injector cylinders to force lubricant from the injector cylinders through the lubricant outlet passages 12. Hydraulic pressure from the pump is also supplied to the pressurizing cylinder 41 to pressurize the lubricant in the container at a pressure that is substantially lower than the pump pressure. However, the inlet check valves 23 cannot open and allow flow of lubricant to the injector cylinders until the hydraulic pressure at the other side of the injector pistons is terminated. The accumulator 91 is also charged or recharged while the pump is operating and, when the motor is de-energized to stop the pump, the accumulator operates to continue application of pressure to the pressurizing cylinder 41 to feed lubricant from the lubricant container to the injector cylinders. Thus, when the motor is energized and starts the pump, hydraulic fluid at the pump discharge pressure is applied to the injector cylinders to force lubricant from the injector cylinders to the lubricant discharge passages. When the motor is de-energized and stops the pump, accumulator 91 operates to continue pressurizing the cylinder 41 to feed lubricant from the lubricant container to the injector cylinders. A means such as a manually operable on/off valve 93 is provided for selectively discharging fluid pressure from the accumulator and from the pressurizing cylinder 41, to allow recharging or reloading of the lubricant container.

The embodiments of the invention in which an exclusive property or privilege is claimed are defined as follows:

1. A system for distributing viscous lubricant comprising, lubricant container means having a lubricant outlet, a plurality of injector cylinders each having a floating piston therein, lubricant inlet passage means communicating the lubricant outlet with each of the injector cylinders at one side of the floating piston therein, the lubricant inlet passage means including inlet check valve means individual to each injector cylinder operable to open for flow to the respective injector cylinder, a plurality of lubricant distribution passages each communicating with a respective one of the injector cylinders at said one side of the injector piston, the lubricant distribution passages each including an outlet check valve means operable to open for flow from the respective injector cylinder, hydraulic fluid pressure supply means including a fluid reservoir, pump means and selectively operable motor means for driving said pump means to supply hydraulic fluid at a preselected high pressure range, means for supplying fluid at said high pressure to the injector cylinders at a second side of the floating piston therein to feed lubricant from the injector cylinders to the lubricant distribution passages, and means actuated by said fluid pressure supply means for pressurizing the lubricant in the lubricant container means at a second pressure that is low as compared to said preselected high pressure range to feed lubricant from the lubricant container means to the injector cylinders.

2. A system for distributing viscous lubricants according to claim 1 including means for inhibiting opening of said outlet check valve means until the pressure in the associated injector cylinder at said one side of the floating piston is greater than said second pressure.

3. A system for distributing viscous lubricants according to claim 1 wherein said means for applying a first pressure to the lubricant in the lubricant container means includes a plunger in the lubricant container, a pressurizing cylinder connected to lubricant container, and a pressurizing piston in the pressurizing cylinder and connected to the plunger.

4. A system for distributing viscous lubricant according to claim 3 wherein said pressurizing piston has an area that is smaller than the area of the plunger and such that the plunger pressurizes the lubricant in the lubricant container means at said second pressure when fluid at said high pressure range is applied to the pressurizing piston.

5. A system for distributing viscous lubricant according to claim 3 wherein said fluid pressure supply means includes valve means operable in a first position to supply fluid pressure to the injector cylinders and in a second position to supply fluid pressure to said pressurizing cylinder.

6. A system for distributing viscous lubricant according to claim 5 including timer means for controlling operation of the valve means between the first and the second positions.

7. A system for distributing viscous lubricant according to claim 4 including means for selectively energizing and de-energizing the motor to start and stop the pump means, passage means for supplying fluid pressure from the pump means to the pressurizing cylinder and to the injector cylinder while the pump means is running, and means for supplying fluid pressure to pressurizing cylinder after the pump has stopped.

8. A system for distributing viscous lubricant according to claim 4 wherein said selectively operable hydraulic fluid pressure supply means includes a hydraulic accumulator operable to accumulate hydraulic fluid under pressure while said motor is energized and drives the pump, said accumulator being operative to supply fluid pressure to said pressurizing piston when the motor is deenergized and stops the pump.

9. A system for distributing a viscous lubricant comprising, lubricant container means having a lubricant outlet adjacent one end and plunger means in the container means movable toward and away from the lubricant outlet, pressurizing cylinder means connected to the lubricant container means and lubricant pressurizing piston means in the pressurizing cylinder means connected to the plunger means for moving the latter toward the lubricant outlet, lubricant distribution means including a plurality of injector cylinders each having a floating piston therein, first passage means communicating the lubricant outlet with each of the injector cylinders at one side of the floating piston therein, the first passage means including first check valve means individual to each injector cylinder operable to open for flow to the respective injector cylinder, a plurality of lubricant distribution passages each communicating with a respective one of the injector cylinders at said one side of the floating piston therein, the lubricant distribution passages each including second check valves means operable to open for flow from the respective injector cylinder means, hydraulic fluid pressure supply means including a fluid reservoir, pump means and selectively operable motor means for driving said pump means to supply hydraulic fluid at a preselected high pressure range, means for supplying fluid from the hydraulic fluid pressure supply means to the pressurizing cylinder means for feeding lubricant from the lubricant container through the first passage means to the injector cylinders, and means for supplying fluid pressure from the hydraulic fluid pressure supply means to each of the injector cylinders at a second side of the floating piston therein to feed lubricant from the injector cylinders, said pressurizing piston means having an area smaller than the area of the plunger means and such that the plunger means applies pressure to the lubricant in the lubricant container means that is substantially lower than the hydraulic fluid pressure supplied to the pressurizing piston means.

10. A system for dispensing viscous lubricant according to claim 9 including means for inhibiting opening of said second check valve means until the pressure in the associated injector cylinder at said one side of the floating piston is greater than the pressure applied by the plunger to the lubricant in the lubricant container.

11. A system for distributing viscous lubricant according to claim 9 wherein said fluid pressure supply means includes valve means operable in a first position to supply fluid pressure to the injector cylinders and in a second position to supply fluid pressure to said pressurizing cylinder.

12. A system for distributing viscous lubricant according to claim 11 including timer means for controlling operation of the valve means between the first and the second positions.

13. A system for distributing viscous lubricant according to claim 9 wherein said selectively operable hydraulic fluid pressure supply means includes an hydraulic accumulator operable to accumulate hydraulic fluid under pressure while said motor is energized and drives the pump, said accumulator being operative to supply fluid pressure to said pressurizing piston means when the motor is deenergized and stops the pump.

14. A system for distributing viscous lubricant according to claim 13 including valve means for selectively discharging the accumulator to the fluid reservoir.

* * * * *